United States Patent
Schaller

(10) Patent No.: US 7,181,907 B2
(45) Date of Patent: Feb. 27, 2007

(54) METHOD AND SYSTEM FOR REGENERATING, PARTICULARLY DESULFATING, A STORAGE-TYPE CATALYTIC CONVERTER DURING THE PURIFICATION OF EXHAUST GASES

(75) Inventor: Johannes Schaller, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 2 days.

(21) Appl. No.: 10/470,523

(22) PCT Filed: Oct. 19, 2002

(86) PCT No.: PCT/DE02/03952

§ 371 (c)(1),
(2), (4) Date: Mar. 30, 2004

(87) PCT Pub. No.: WO03/047732

PCT Pub. Date: Jun. 12, 2003

(65) Prior Publication Data

US 2004/0148927 A1    Aug. 5, 2004

(30) Foreign Application Priority Data

Nov. 29, 2001  (DE) ................. 101 58 568

(51) Int. Cl.
*F01N 3/00*       (2006.01)
(52) U.S. Cl. ................ 60/295; 60/274; 60/285; 60/297; 60/303
(58) Field of Classification Search .......... 60/274, 60/285, 286, 295, 297, 303
See application file for complete search history.

(56) References Cited

U.S. PATENT DOCUMENTS

| | | | |
|---|---|---|---|
| 5,758,493 A | 6/1998 | Asik et al. | |
| 5,974,788 A | 11/1999 | Hepburn et al. | |
| 5,974,791 A * | 11/1999 | Hirota et al. | 60/276 |
| 5,979,159 A | 11/1999 | Adamczyk et al. | |
| 6,058,700 A | 5/2000 | Yamashita et al. | |
| 6,189,316 B1 | 2/2001 | Surnilla et al. | |
| 6,199,372 B1 * | 3/2001 | Wakamoto | 60/274 |
| 6,199,373 B1 | 3/2001 | Hepburn et al. | |
| 6,233,925 B1 * | 5/2001 | Hirota et al. | 60/285 |
| 6,318,075 B1 * | 11/2001 | Gunther et al. | 60/285 |
| 6,378,297 B1 * | 4/2002 | Ito et al. | 60/284 |
| 6,735,940 B2 * | 5/2004 | Stroia et al. | 60/286 |
| 6,779,339 B1 * | 8/2004 | Laroo et al. | 60/297 |
| 6,813,882 B2 * | 11/2004 | Hepburn et al. | 60/286 |

FOREIGN PATENT DOCUMENTS

| | | |
|---|---|---|
| FR | 2 809 767 | 12/2001 |
| GB | 2 328 626 | 3/1999 |

* cited by examiner

*Primary Examiner*—Binh Q. Tran
(74) *Attorney, Agent, or Firm*—Kenyon & Kenyon LLP

(57) ABSTRACT

A method and a system for regenerating, in particular desulfating, storage catalysts in the cleaning of exhaust gas from internal combustion engines. During the regeneration phase the combustion is controlled, initially inside the engine, by a control unit in such a way that the air ratio $\lambda$ in the exhaust gas is lowered to a first value $\lambda_1$, and subsequently a feed device for the reducing agent is controlled by the control unit in such a way that the air ratio $\lambda$ is set at a second, lower value $\lambda_2 < 1$. This ensures that the temperatures occurring at the entry side of the storage catalyst are sufficient for effective desulfation without damaging the storage catalyst.

15 Claims, 1 Drawing Sheet

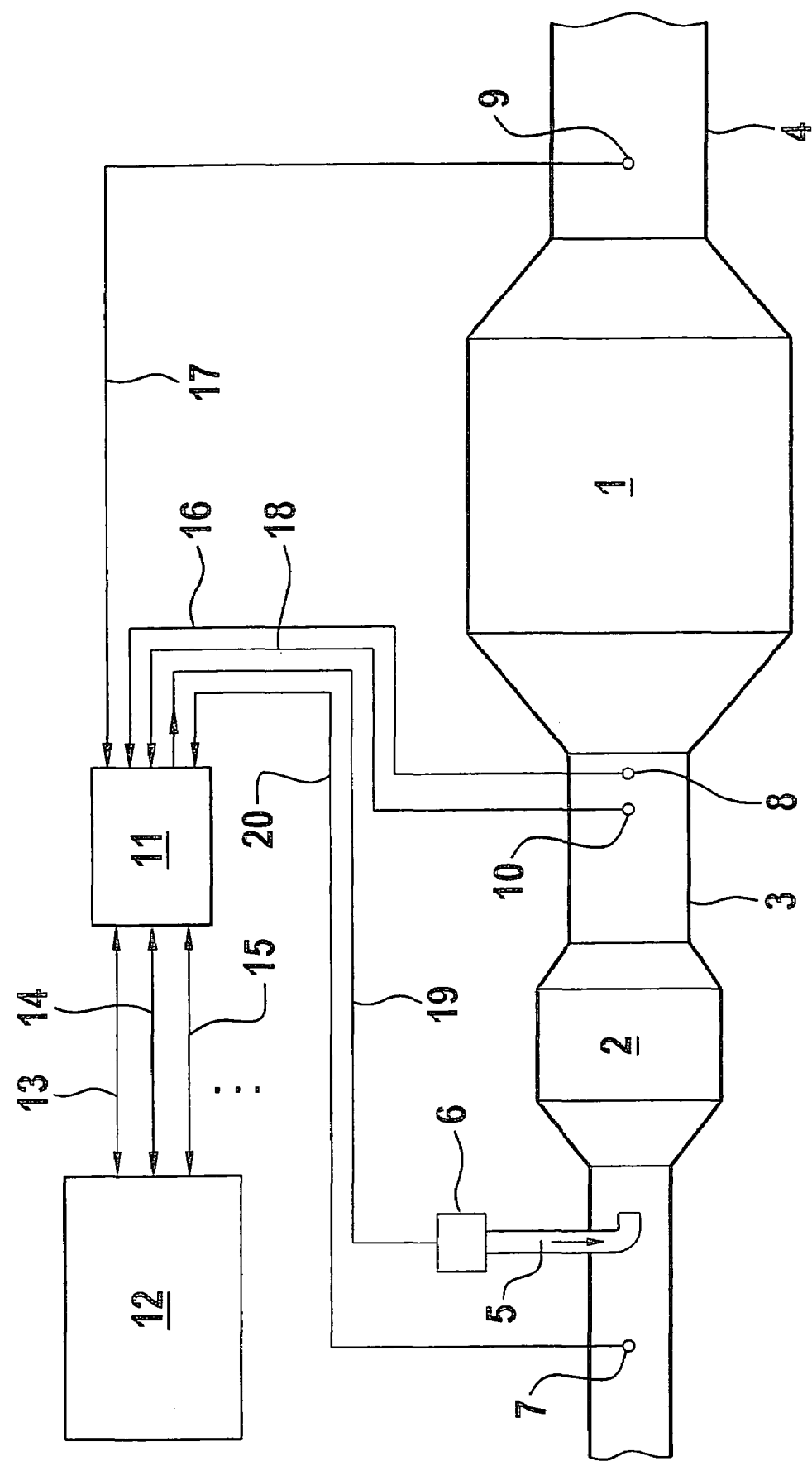

METHOD AND SYSTEM FOR REGENERATING, PARTICULARLY DESULFATING, A STORAGE-TYPE CATALYTIC CONVERTER DURING THE PURIFICATION OF EXHAUST GASES

FIELD OF THE INVENTION

The present invention relates to a method for regenerating, in particular desulfating, storage catalysts in the cleaning of exhaust gas from internal combustion engines, in which during the regeneration phase a reducing exhaust gas mixture having an air ratio $\lambda<1$ is produced and passed through the storage catalyst. The present invention further relates to a system for regenerating, in particular desulfating, a storage catalyst for cleaning the exhaust gas from an internal combustion engine, using a feed device for feeding a reducing agent into the entry side of the storage catalyst.

BACKGROUND INFORMATION

Generic storage catalysts are used for cleaning exhaust gases from an internal combustion engine (diesel engine), the storage catalysts removing nitrogen oxides ($NO_x$) from the exhaust gas stream by storage. Sulfur oxides ($SO_x$) are also removed in this manner. The loading of a storage catalyst with nitrogen oxides usually occurs over a period of up to approximately two minutes (depending on the operating point, but also for only approximately 0.3 to 1.0 minutes). The loaded catalyst must subsequently be regenerated. In the regeneration phase, nitrogen oxides are reduced to nitrogen and supplied to the exhaust gas. A reducing environment (rich mixture) with a prevailing air ratio $\lambda<1$ is necessary for this removal or regeneration process. The duration of these rich phases is approximately 1 to 30 seconds.

Rich phases may be produced either inside the engine by suitable combustion operations, or downstream from the engine by adding a reducing agent (diesel fuel, for example) to the exhaust gas. The addition of reducing agent downstream from the engine has the advantage that it may be performed independently of the operating point of the engine, unnoticed by the driver. It is possible to meet requirements such as constant engine response, constant torque, constant noise, and unchanged vehicle dynamics by the addition of reducing agent downstream from the engine.

In addition to the periodic $NO_x$ regeneration of the storage catalysts, these storage catalysts must also be desulfated but at longer time intervals. The desulfation generally occurs using a rich exhaust gas mixture ($\lambda<1$) at an exhaust gas temperature of 600° C. Periodic fluctuations about $\lambda=1$ are typically imposed here to avoid HC or CO breakthroughs. The duration of the desulfation is approximately 5 minutes. The desired conditions for this desulfation are difficult to establish inside the engine for the referenced duration, so that the opportunity again presents itself for adding reducing agent downstream from the engine.

To this end, the reducing agent is oxidized on an oxidation catalyst by the oxygen contained in the exhaust gas, with the release of heat. However, if the air ratio in the diesel exhaust gas is to be adjusted in this manner from approximately $\lambda=2$ to $\lambda=0.95$, temperatures above 1000° C. may arise, which would result in destruction of the storage catalyst.

U.S. Pat. No. 6,199,373 describes a method of desulfurizing an $NO_x$ storage catalyst by burning off at temperatures of at least 675° C. A modulation of the air ratio at a specified frequency and amplitude is proposed to this end so that the temperature is increased to the necessary level in the storage catalyst situated downstream from a three-way catalytic converter. $O_2$, HC, and CO are essentially completely catalytically reacted exothermically in the storage catalyst, resulting in the desired temperature increase.

A similar method of desulfation is described in U.S. Pat. No. 5,974,788, in which the amplitude of the air ratio of the mixture supplied to the engine is modulated in such a way that oxygen is taken into the storage catalyst during a lean cylinder phase, and during a rich cylinder phase the oxygen then initiates the exothermic reaction required for the temperature increase.

A method of desulfating an $NO_x$ storage catalyst is described in U.S. Pat. No. 5,758,493 in which a portion of the engine cylinders operates using a rich mixture, and the other portion operates using a lean mixture, during the sulfation. The two exhaust gas streams are fed separately to the storage catalyst in order to undergo a catalytic exothermic chemical reaction in the catalyst. The resulting temperature increase is therefore sufficient to remove $SO_x$.

A method based on the same principles, in which additionally any temperature drop in the storage catalyst is monitored and prevented, is known from U.S. Pat. No. 6,189,316.

Lastly, a method is known from U.S. Pat. No. 5,979,159 for desulfating a storage catalyst situated downstream from a three-way catalytic converter, in which an exothermic reaction is initiated in the three-way catalytic converter, producing an exhaust gas stream at elevated temperature which is used for desulfating the storage catalyst situated downstream.

In contrast to these known desulfation methods, the problem at hand is to limit the exhaust gas temperature which arises during the rich phase regeneration downstream from the engine to values which may be considered safe for the downstream components of the exhaust gas cleaning system, in particular for the storage catalyst itself, and which are sufficient for complete regeneration of the storage catalyst.

SUMMARY OF THE INVENTION

According to the present invention, for regenerating the referenced storage catalysts it is proposed that during the regeneration phase the combustion be controlled, initially inside the engine, in such a way that the air ratio is lowered to a first value $\lambda_1$, and only thereafter is the air ratio set at a second, lower value $\lambda_2<1$ by adding a reducing agent downstream from the engine. This combination of measures inside the engine and downstream from the engine for lowering the air ratio allows a rich phase to be produced in two steps, enabling better monitoring and limitation of the exhaust gas temperature than has been achieved thus far.

The first lowering of the air ratio may be achieved using the method according to the present invention without significantly raising the exhaust gas temperature. An air ratio of $\lambda<1$ is subsequently set by the addition of reducing agent downstream from the engine, it being possible to maintain an upper limit for the temperature for which no damage to the downstream components, in particular the storage catalyst, is to be expected.

The control of combustion performed inside the engine during the regeneration phase advantageously includes the following measures, singly or in combination: increasing the exhaust gas recirculation rate, throttling of the intake air, and control of the combustion operation inside the cylinders or the injection progression. The referenced measures may contribute, singly or in combination, to reduction of the oxygen content in the exhaust gas, and thus reduce air ratio $\lambda$.

The air ratio is advantageously lowered to a first value $\lambda_1$ between 1.0 and 2.0, in particular to approximately 1.5, by these measures inside the engine. These measures are exhausted to the extent possible without affecting the vehicle dynamics. Thus, it is possible to achieve values of $\lambda=1.5$ without significantly raising the exhaust gas temperature.

For the effective regeneration of the storage catalyst, air ratios are set at values between 0.9 and less than 1.0, in particular approximately 0.95, by the subsequent addition of reducing agent downstream from the engine. The exothermic reactions which occur result in the desired temperature increase, which should be approximately 600° C. for desulfation. At the same time, the present invention ensures that the exhaust gas temperatures do not exceed 700° C., so that the storage catalyst may be safely desulfated without the risk of damage.

One system according to the present invention for regenerating, in particular desulfating, a storage catalyst for cleaning the exhaust gas from an internal combustion engine includes a feed device for feeding a reducing agent to the entry side of the storage catalyst, and also includes at least one $\lambda$ probe for determining the air ratio of the exhaust gas to be fed to the storage catalyst, a control unit for controlling the combustion inside the engine being provided which is connected to the at least one $\lambda$ probe and to the feed device for feeding a reducing agent.

One possibility for detecting an excessive sulfur content in the catalyst, which makes desulfation necessary, is to measure the decrease in $NO_x$ conversion in the storage catalyst using one or more sensors. In this case, the referenced control unit is in operative connection to this at least one sensor.

The control unit for this system according to the present invention allows the combustion inside the engine to be controlled as a function of corresponding signals from the sensor(s) which detect a decrease in the $NO_x$ conversion in the storage catalyst. This decrease may be caused by loading of the catalyst with $NO_x$, but also with $SO_x$, the $NO_x$ conversion decreasing in both cases.

The control unit is able at this point to control the combustion inside the engine using the above-described measures in such a way that the air ratio is lowered to a first value. The air ratio is measured using a $\lambda$ probe and sends a corresponding signal to the control unit. If the air ratio has dropped to the first value, the control unit is able to actuate the feed device for feeding a reducing agent in order to produce the rich mixture, having an air ratio $\lambda<1$, necessary for regenerating the storage catalyst.

In one advantageous embodiment, the system according to the present invention contains a temperature sensor which likewise is in operative connection to the control unit, so that the particular temperature required for regeneration may be monitored and maintained.

For desulfation it is advantageous to connect an oxidation catalyst upstream from the storage catalyst, the reducing agent being supplied at the entry side of the oxidation catalyst using the feed device. In the oxidation catalyst the reducing agent is catalytically exothermically reacted with the oxygen present in the exhaust gas, so that the actual temperature increase occurs in a controlled manner in this section.

The feed device advantageously includes a solenoid valve as well as a feed line for the reducing agent. The control unit is then able to directly actuate the solenoid valve.

BRIEF DESCRIPTION OF THE DRAWING

The FIGURE shows one embodiment of the system according to the present invention for regenerating a storage catalyst used in an exhaust gas cleaning system.

DETAILED DESCRIPTION

The FIGURE shows one embodiment of a system according to the present invention in a schematic illustration, this system representing a portion of an exhaust gas cleaning system by which exhaust gases produced by an internal combustion engine/diesel engine 12 are catalytically cleaned.

These exhaust gases are composed primarily of nitrogen, carbon dioxide, oxygen, and water, in addition to small amounts of pollutants which include carbon monoxide, uncombusted hydrocarbons, nitrogen oxides, lead compounds, and particulate (soot). Constituents which are not fully combusted, CO and HC (hydrocarbons), are oxidized to carbon dioxide and water by oxidation catalysts. Nitrogen oxides present are removed by reduction catalysts, in this embodiment a storage catalyst 1 being used for this purpose. For regenerating storage catalyst 1, a rich phase is produced by metering a reducing agent (often diesel fuel itself) to the exhaust gas.

In the embodiment illustrated, an oxidation catalyst 2 is situated upstream from storage catalyst 1, it being possible to introduce a reducing agent into the exhaust gas stream at the entry side of oxidation catalyst 2 via a feed line 5. The feed is regulated by a solenoid valve 6.

In addition, a $\lambda$ probe 7 is situated in the exhaust gas stream to measure the air ratio of the exhaust gas flowing to oxidation catalyst 2.

According to the present invention, a control unit 11 is provided which is in operative connection to solenoid valve 6 via line 19 and to $\lambda$ probe 7 via line 20.

Two sensors 8 and 9 detect the $NO_x$ conversion in storage catalyst 1, the output signals generated being sent to control unit 11 via lines 16 and 17.

For measuring and monitoring the exhaust gas temperature, upstream from storage catalyst 1 a temperature sensor 10 is provided which is able to deliver signals to control unit 11 via line 18.

Control unit 11 is connected on the other side to actuators which are responsible for controlling, inside the engine, the combustion in engine 12. In this embodiment, control unit 11 is connected via line 13 to an actuator for controlling the exhaust gas recirculation, via line 14 to an actuator for controlling the start of injection, and via line 15 to the throttle valve for throttling the intake air.

The illustrated system is suitable in particular for desulfating storage catalyst 1, as described below. Sensors 8 and 9 detect the $NO_x$ conversion in storage catalyst 1, which is calculated in control unit 11. When it is possible to deduce by a decrease in the conversion or by another suitable method that the sulfur content in catalyst 1 is excessive, desulfation is initiated. Firstly, by influencing the exhaust gas recirculation, the start of injection, and/or the throttle valve, for example, the parameters specifying the combustion in engine 12 are modified in such a way that the oxygen content in the exhaust gas is decreased. Lastly, measurement is performed by a $\lambda$ probe 7. If the oxygen content is sufficiently low—for example, if it has reached a value of approximately 1.5—a signal for opening solenoid valve 6 is sent from control unit 11 via line 19, which allows reducing agent (diesel fuel, for example) to flow into the exhaust gas line. This reducing agent is catalytically oxidized on oxidation catalyst 2 with the oxygen contained in the exhaust gas, thereby releasing heat which causes a temperature increase in the exhaust gas flowing to storage catalyst 1. As a result of this addition of reducing agent downstream from the engine, a second, lower value of air ratio $\lambda$ is set, a value of $\lambda=0.95$ or a cycled curve around $\lambda=1$ being advantageous in particular. An additional $\lambda$ probe (not illustrated) on entry side 3 of storage catalyst 1 is able to detect and monitor the decrease to a second, lower value of air ratio $\lambda$.

In the described method according to the present invention, exhaust gas temperatures for desulfation at approximately 600° C. are measured by optional temperature sensor 10 on entry side 3 of storage catalyst 1, thus ensuring that the exhaust gas temperatures are below 700° C., so that storage catalyst 1 may be safely regenerated.

The present invention allows safe desulfation of storage catalysts without the risk of damage caused by excessive exhaust gas temperatures, while at the same time having minimal influence on the vehicle dynamics.

What is claimed is:

1. A method for regenerating a storage catalyst in a cleaning of an exhaust gas from an internal combustion engine, comprising:
    producing a reducing exhaust gas mixture having an air ratio $\lambda<1$ during a regeneration phase;
    passing the reducing exhaust gas mixture through the storage catalyst; and
    during the regeneration phase, controlling a combustion, initially inside the internal combustion engine, in such a way that the air ratio $\lambda$ in the exhaust gas is lowered to a first value $\lambda_1$, and subsequently the air ratio $\lambda$ is set at a second, lower value $\lambda_2<1$ by adding a reducing agent downstream from the internal combustion engine.

2. The method as recited in claim 1, wherein:
    the regenerating of the storage catalyst includes desulfating the catalyst.

3. The method as recited in claim 1, wherein:
    the controlling of the combustion inside the internal combustion engine includes at least one of the following:
    increasing an exhaust gas recirculation rate,
    throttling an intake air, and
    controlling the combustion inside cylinders and an injection characteristic.

4. The method as recited in claim 1, wherein:
    $\lambda_1$ is between 1.0 and 2.0.

5. The method as recited in claim 1, wherein:
    $\lambda_1$ is approximately 1.5.

6. The method as recited in claim 1, wherein:
    $\lambda_2$ is between 0.9 and 1.0.

7. The method as recited in claim 1, wherein:
    $\lambda_2$ is approximately 0.95.

8. The method as recited in claim 1, further comprising:
    cycling $\lambda$ around the value $\lambda=1$.

9. The method as recited in claim 1, further comprising:
    lowering the air ratio $\lambda$, first to $\lambda_1$ and subsequently to $\lambda_2$, in such a way that a temperature of the reducing exhaust gas mixture supplied to the storage catalyst for desulfation assumes values between 600° C. and 700° C.

10. A system for regenerating a storage catalyst for cleaning an exhaust gas from an internal combustion engine, comprising:
    a feed device for feeding in a reducing agent to an entry side of the storage catalyst;
    at least one $\lambda$ probe for determining an air ratio of the exhaust gas; and
    a control unit for controlling a combustion inside the internal combustion engine and for controlling a feeding of a reducing agent into the exhaust gas, the control unit being in an operative connection to the at least one $\lambda$ probe and to the feed device.

11. The system as recited in claim 10, wherein:
    the regenerating of the storage catalyst includes desulfating the catalyst.

12. The system as recited in claim 10, further comprising:
    at least one sensor for determining a decrease in $NO_x$ conversion in the storage catalyst, the control unit being in an operative connection to the at least one sensor.

13. The system as recited in claim 10, further comprising:
    a temperature sensor in an operative connection to the control unit.

14. The system as recited in claim 10, further comprising:
    an oxidation catalyst situated upstream from the storage catalyst and for providing a catalytic oxidation of the reducing agent, the feed device being situated upstream from the oxidation catalyst.

15. The system as recited in claim 10, wherein:
    the feed device includes a solenoid valve and a feed line for the reducing agent.

* * * * *